US012248991B2

(12) United States Patent
Corder et al.

(10) Patent No.: US 12,248,991 B2
(45) Date of Patent: *Mar. 11, 2025

(54) HOME EVENT DETECTION AND PROCESSING

(71) Applicant: Allstate Insurance Company, Northbrook, IL (US)

(72) Inventors: Bryan Keith Corder, Gurnee, IL (US); Rothana Srey, Dekalb, IL (US); Nicholas A. Suizzo, Cody, WY (US); Sean P. Willett, Chicago, IL (US)

(73) Assignee: Allstate Insurance Company, Northbrook, IL (US)

( * ) Notice: Subject to any disclaimer, the term of this patent is extended or adjusted under 35 U.S.C. 154(b) by 238 days.

This patent is subject to a terminal disclaimer.

(21) Appl. No.: 17/950,506

(22) Filed: Sep. 22, 2022

(65) Prior Publication Data

US 2023/0186399 A1 Jun. 15, 2023

Related U.S. Application Data

(63) Continuation of application No. 16/666,762, filed on Oct. 29, 2019, now Pat. No. 11,481,847, which is a continuation of application No. 14/202,205, filed on Mar. 10, 2014, now Pat. No. 10,467,701.

(51) Int. Cl.
*G06Q 40/08* (2012.01)
(52) U.S. Cl.
CPC .................. *G06Q 40/08* (2013.01)

(58) Field of Classification Search
None
See application file for complete search history.

(56) References Cited

U.S. PATENT DOCUMENTS

| 8,106,769 | B1 * | 1/2012 | Maroney | G06Q 10/10 |
| | | | | 340/540 |
| 11,481,847 | B1 * | 10/2022 | Corder | G06Q 40/08 |
| 2014/0201315 | A1 * | 7/2014 | Jacob | H04L 41/16 |
| | | | | 709/217 |

FOREIGN PATENT DOCUMENTS

WO    WO-2009129496 A2 * 10/2009 ........... G05D 1/0094

* cited by examiner

*Primary Examiner* — David P Sharvin
(74) *Attorney, Agent, or Firm* — Dinsmore & Shohl LLP

(57) ABSTRACT

Systems, methods, apparatuses and computer-readable media for receiving data from one or more sensors associated with one or more home devices, such as appliances, home systems, etc. are provided. The data may be used to determine whether the home device is operating within an expected range or, if it is outside of an expected range or threshold, whether a home event has occurred. Upon occurrence of the home event, an insurance claim to cover any damage caused by the home event may be initiated and/or processed. In some examples, repair of any damage may also be coordinated by the system. In some arrangements, the initiation and/or processing of the claim, and/or coordination of the repair may be performed without any additional input from the user associated with the policy, home device, etc. or with limited additional input from the user.

14 Claims, 6 Drawing Sheets

HOME EVENT DETECTION AND PROCESSING

This application is a continuation of and claims priority to U.S. application Ser. No. 16/666,762, filed Oct. 29, 2019 and U.S. application Ser. No. 14/202,205, filed Mar. 10, 2014, (now U.S. Pat. No. 10,467,701), and entitled "Home Event Detection and Processing," which are incorporated herein by reference in their entireties.

TECHNICAL FIELD

Technical Field

Aspects of the disclosure generally relate to monitoring and/or sensing of one or more home devices. In particular, various aspects described herein relate to receiving data from one or more sensors associated with one or more home devices and using the data to determine whether a home event has occurred. Upon determining that a home event has occurred, an insurance claim may be processed and/or repair of any damage may be coordinated.

BACKGROUND

People are often looking for ways to protect their homes. People buy insurance for exactly that reason—to protect against unforeseen risks. However, breakage, damage, etc. may occur in a home or dwelling. Although damage can be minimized if the problem or issue is recognized as soon as it occurs or as soon as possible after it occurs, often, the damage or breakage is not detected right away. For instance, a pipe may be leaking and thereby causing water damage. However, the leak might not be detected under damage to a wall, ceiling, floor, etc. is visible.

Further, some conventional systems require a user to initiate an insurance claim to cover the damage and/or coordinate repair. This may be time consuming and inefficient in that it could delay the repair process.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure relate to systems, methods, apparatuses and computer-readable media for receiving data from one or more sensors associated with one or more home devices, such as appliances, home systems, etc. The data may be used to determine whether the home device is operating within an expected range or, if it is outside of an expected range or threshold, whether a home event has occurred. Upon occurrence of the home event, an insurance claim to cover any damage caused by the home event may be initiated and/or processed. In some examples, repair of any damage may also be coordinated by the system. In some arrangements, the initiation and/or processing of the claim, and/or coordination of the repair may be performed without any additional input from the user associated with the policy, home device, etc. or with limited additional input from the user.

Other features and advantages of the disclosure will be apparent from the additional description provided herein.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings, which form a part hereof, and in which is shown by way of illustration, various embodiments of the disclosure that may be practiced. It is to be understood that other embodiments may be utilized.

As will be appreciated by one of skill in the art upon reading the following disclosure, various aspects described herein may be embodied as a method, a computer system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Figure 1:
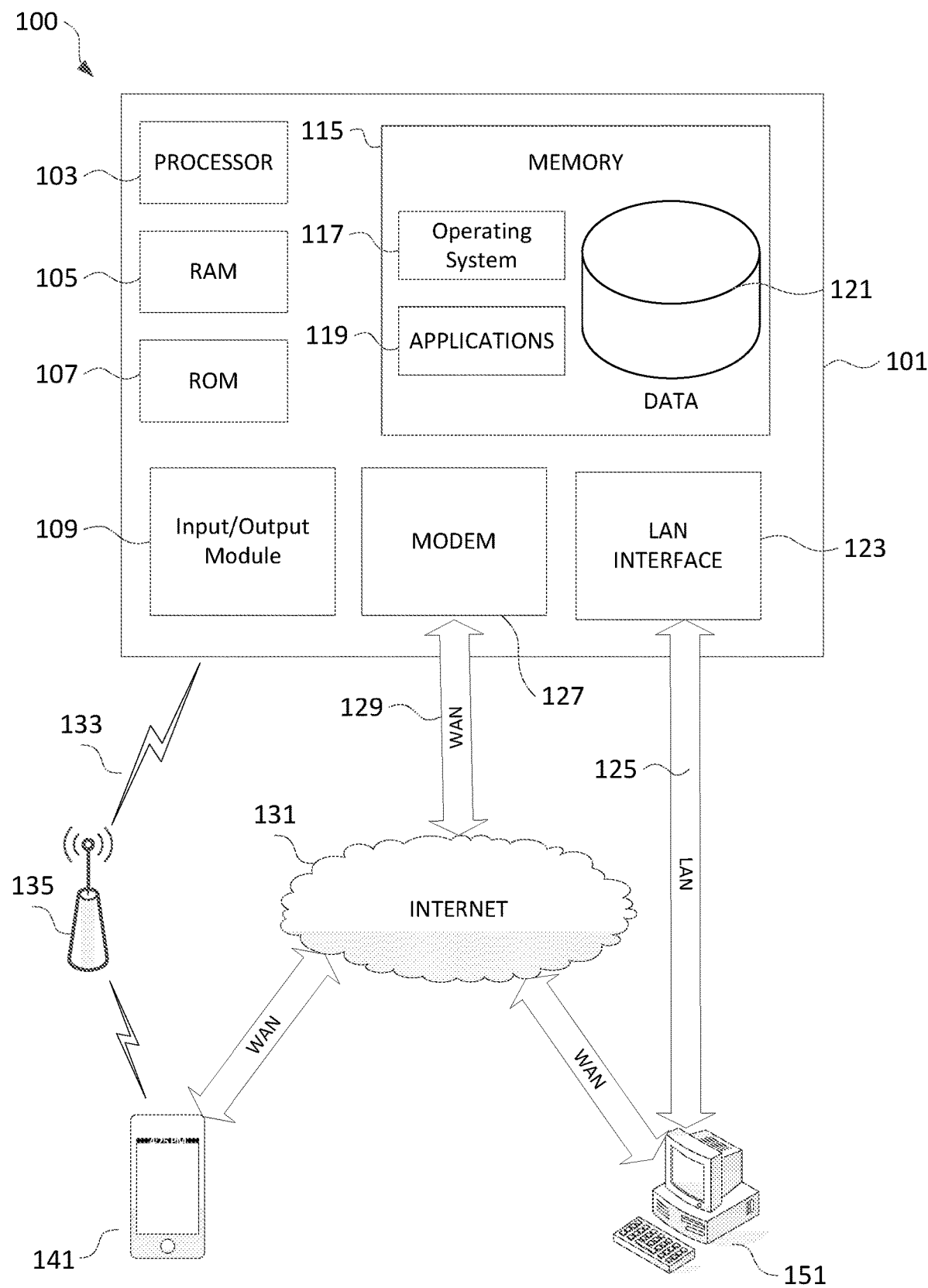
FIG. 1 illustrates a network environment and computing systems that may be used to implement aspects of the disclosure.

FIG. 1 illustrates a block diagram of a computing device (or system) 101 in communication system 100 that may be used according to one or more illustrative arrangements of the disclosure. The device 101 may have a processor 103 for controlling overall operation of the device 101 and its associated components, including RAM 105, ROM 107, input/output module 109, and memory 115. The computing device 101, along with one or more additional devices (e.g., terminals 141, 151) may correspond to any of multiple systems or devices, such as various servers or systems, such as a system or systems for sensing and/or monitoring aspects of one or more home devices, systems for identifying the occurrence of a home event, systems for processing one or more insurance claims, and the like, configured as described herein for receiving data associated with one or more home devices to determine whether a home event has occurred and, responsive to determining that a home even has occurred, processing an insurance claim and/or coordinating a repair or replacement aspect.

Input/Output (I/O) 109 may include a microphone, keypad, touch screen, and/or stylus through which a user of the computing device 101 may provide input, and may also include one or more of a speaker for providing audio output and a video display device for providing textual, audiovisual and/or graphical output. Software may be stored within memory 115 and/or storage to provide instructions to processor 103 for enabling device 101 to perform various functions. For example, memory 115 may store software used by the device 101, such as an operating system 117, application programs 119, and an associated internal database 121. Processor 103 and its associated components may allow the system 101 to execute a series of computer-readable instructions to receive data associated with one or more home devices, determine whether a home event has occurred, process an insurance claim and/or coordinate a repair of the portion of the home effected by the home event.

The system 101 may operate in a networked environment 100 supporting connections to one or more remote computers, such as terminals 141 and 151. The terminals 141 and 151 may be personal computers, servers (e.g., web servers, database servers), or mobile communication devices (e.g., mobile phones, portable computing devices, and the like), and may include some or all of the elements described above with respect to the sensing or monitoring system 101. The network connections depicted in FIG. 1 include a local area network (LAN) 125 and a wide area network (WAN) 129, and a wireless telecommunications network 133, but may also include other networks. When used in a LAN networking environment, the system 101 may be connected to the LAN 125 through a network interface or adapter 123. When used in a WAN networking environment, the system 101 may include a modem 127 or other means for establishing communications over the WAN 129, such as network 131 (e.g., the Internet). When used in a wireless telecommunications network 133, the system 101 may include one or more transceivers, digital signal processors, and additional circuitry and software for communicating with wireless computing devices 141 (e.g., mobile phones, portable computing devices, and the like) via one or more network devices 135 (e.g., base transceiver stations) in the wireless network 133.

It will be appreciated that the network connections shown are illustrative and other means of establishing a communications link between the computers may be used. The existence of any of various network protocols such as TCP/IP, Ethernet, FTP, HTTP and the like, and of various wireless communication technologies such as GSM, CDMA, WiFi, WiMAX, and wireless mesh networks, is presumed, and the various computing devices and system components described herein may be configured to communicate using any of these network protocols or technologies.

Additionally, one or more application programs 119 used by the sensing system 101 may include computer-executable instructions (e.g., home device data analysis, etc.) for receiving data associated with a home device of a user, analyzing the data to determine whether a home event has occurred, processing an insurance claim associated with the home event, and/or coordinating repair of the home damaged or affected by the home event.

The systems described herein may be used by an insurance provider, financial institution or other entity to monitor one or more home devices of a user. Although many examples herein will be described as being used in conjunction with an insurance provider, the systems and methods described herein may be used by or with other entities or types of entities without departing from the invention.

Figure 2:
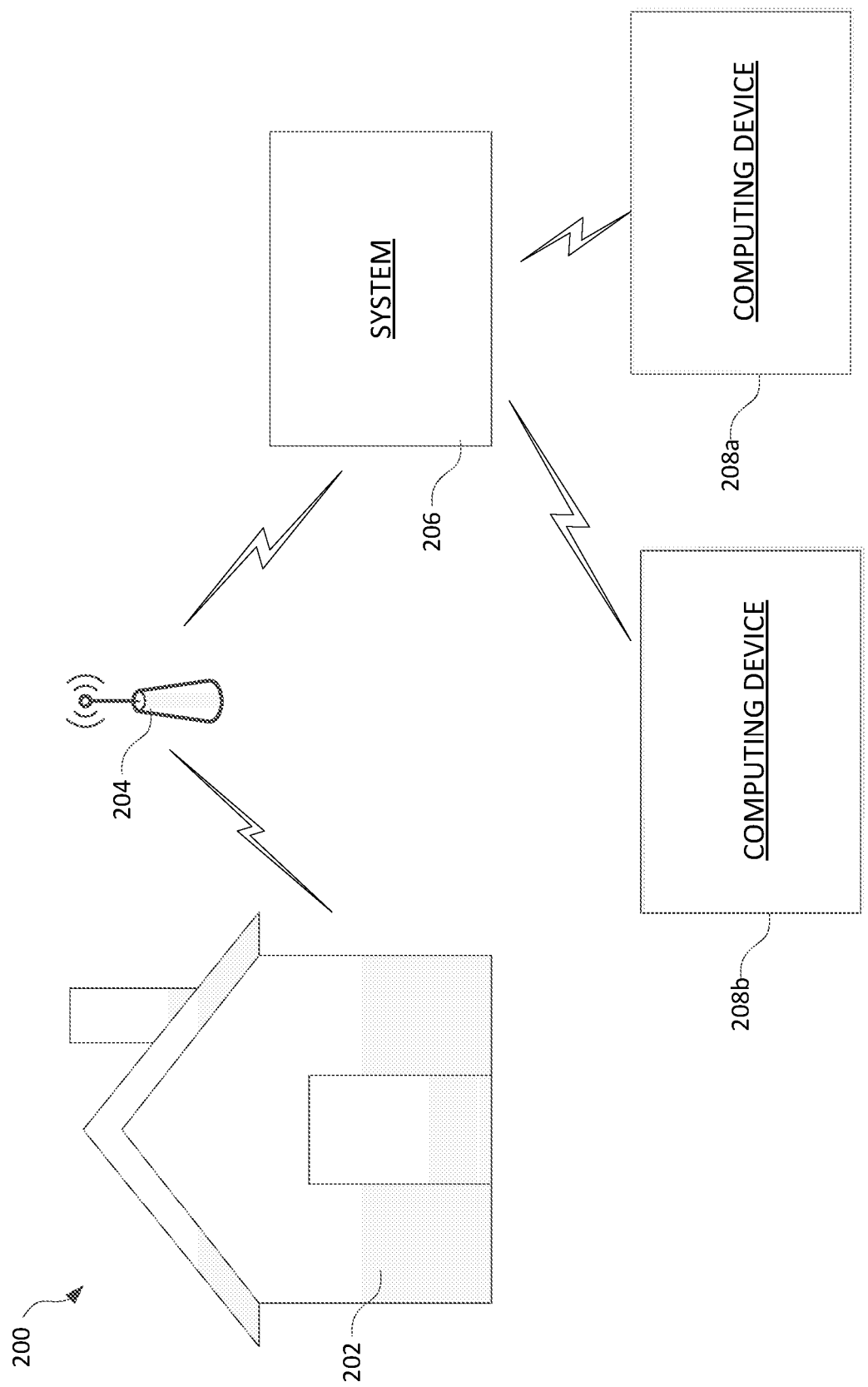
FIG. 2 is a schematic diagram of an example home event detection and processing system according to one or more aspects described herein.

In some arrangements, a sensing or monitoring system may be implemented by an entity. In some examples, the entity may be an insurance provider. FIG. 2 is a schematic illustration of a sensing and/or monitoring system arrangement according to one or more aspects described herein. As shown in FIG. 2, the arrangement 200 may include a home 202. The home 202 generally includes a variety of systems, appliances, etc. that may be monitored by the sensing system described herein. For instance, one or more sensors or sensing devices may be arranged on or integrated into devices such as hot water heaters, refrigerators, washing machines, dryers, furnaces, air conditioning units, windows (e.g., to detect breakage), pipes (e.g., to detect leakage), utilities or utility meters, such as gas, water, and electric, and the like. In some examples, sensors or other monitoring devices may be arranged on or integrated into paint, bricks or other building materials, and the like. Other home devices may include sensors or be monitored without departing from the invention.

In some examples, various types of sensors may be used with the sensing and/or monitoring system. For instance, power sensors, moisture sensors, heat or smoke sensing devices, motion sensors, presence sensors, and the like, may be used. In still other examples, "smart" materials may be used, such as smart paints, smart bricks, and the like, that may provide indications of wear or potential failure.

The home 202 depicted in FIG. 2 may include a plurality of appliances and/or systems and one or more of the appliances and/or systems (e.g., devices) may be monitored by one or more sensing devices, as will be described more fully below. Signals from the one or more sensing devices may be transmitted to the sensing system 206 at an entity, such as an insurance provider. In some examples, the signals may be wirelessly transmitted and may be transmitted to a base collection unit 204 prior to transmission to the system 206. Alternatively, the signals may be transmitted directly to the system 206, e.g., via wired or wireless means. In some arrangements, the data may be collected in real-time and/or transmitted in real-time or near real-time. Additionally or alternatively, the data may be collected and/or transmitted in batches.

In some examples, the system 206 may process the received data to determine whether a home event has occurred, as will be discussed more fully below. Upon occurrence of a home event, the system 206 may transmit an indicator to the user associated with the home. The indicator may be transmitted to a computing device of the user, such as computing device 208a. The computing device 208a may be any of several types of computing devices, such as a smartphone, cellphone, laptop computer, tablet computer, and the like. In some examples, as will be discussed more fully below, the system 206 may process or initiate processing of an insurance claim based on the home event. The system 206 may further initiate a repair of the home or portion of the home damaged by the home event. Accordingly, data associated with the insurance claim and/or the repair may be transmitted to a computing device, such as computing device 208b, associated with continued processing of the insurance claim, the repair provider, etc. Computing device 208b may also be any of several types of computing devices, including those described above. The data may be transmitted from the system 206 to computing devices 208a, 208b via wired or wireless transmission. Further, more or fewer computing devices may receive data from system 206, as desired. Nothing in this disclosure should limit the system to transmission to two computing devices.

Figure 3:
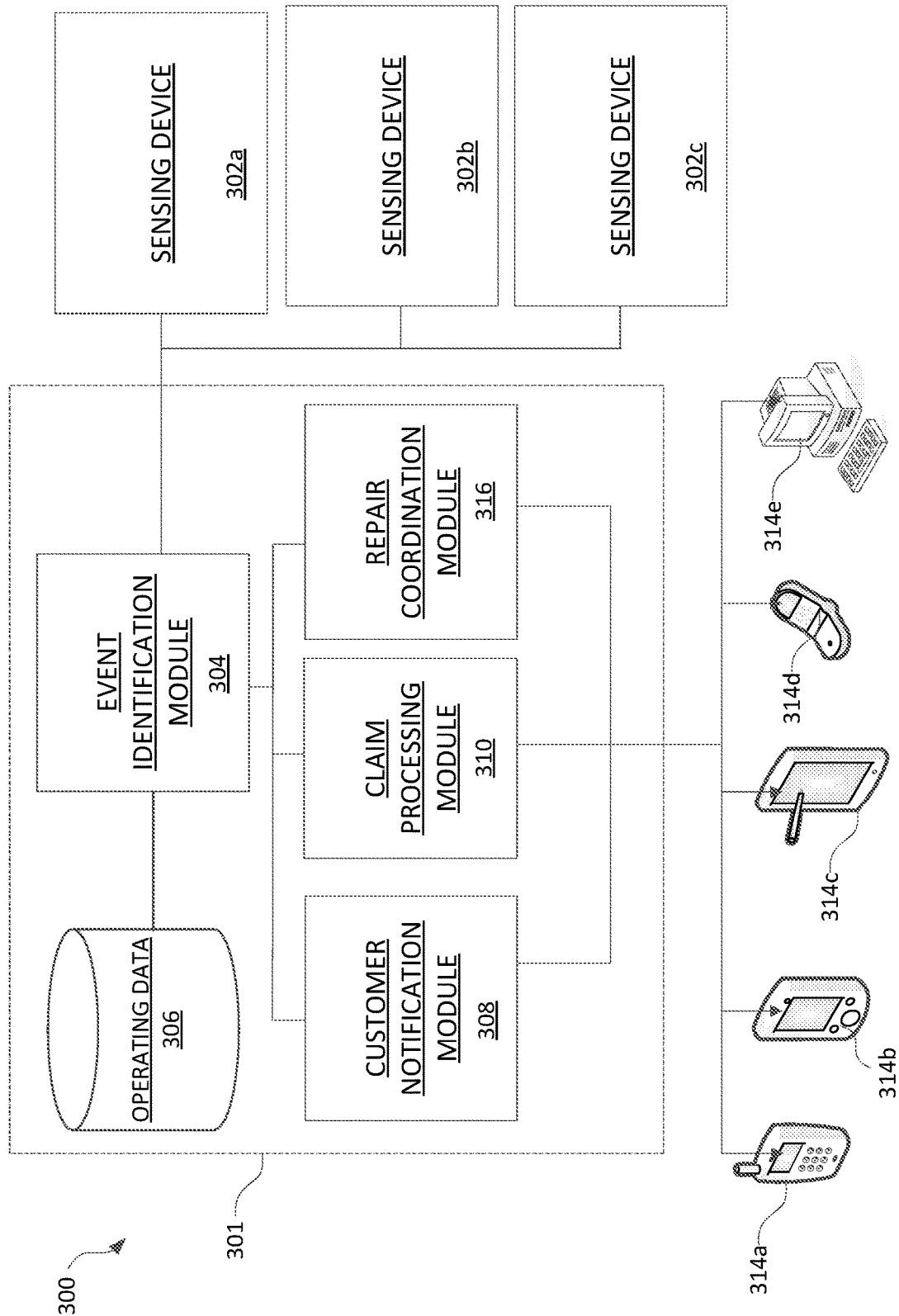
FIG. 3 is an example home event detection and processing system according to one or more aspects described herein.

FIG. 3 illustrates one example home event detection and processing system 300. Each component shown in FIG. 3 may be implemented in hardware, software or a combination of the two. Additionally, each component of the home event detection and processing system may include a computing device (or system) having some or all of the structural components described above for computing device 101. In some arrangements, some or all of the components of system 300 may be housed in a single physical device. Alternatively, some or all of the components may be housed in separate physical devices.

The home event detection and processing system 300 may be associated with an entity 301. For instance, the system 300 may be implemented by an entity 301, such as an insurance provider. In other examples, the system 300 may be implemented by various other types of companies, universities, government entities, and the like. Several examples discussed herein will be described in the context of an insurance provider. However, nothing in the disclosure should be viewed as limiting the systems, methods, computer-readable media, and the like, described herein to use with insurance providers.

The home event detection and processing system 300 may include a plurality of sensing devices 302a-302c. The sensing devices 302a-302c may be a variety of types of devices and may be used to monitor or sense one or more characteristics of a home device, such as an appliance, system, etc. For instance, the sensing devices 302a-302c may include float switches, moisture sensors, power sensors or monitors, wear indicating devices, speed sensors, motion sensors, smoke or heat sensors, breakage sensors, cameras, proximity sensors, presence sensors, and the like. In other examples, the sensing devices 302a-302c may include devices for sensing temperature, sewage backup, natural gas, propane, etc., air quality (e.g., carbon monoxide, etc.), air flow quality, water flow, and the like. The sensing devices may include one or more video monitoring devices such as security or other video cameras, live video feeds, and the like, that may receive and/or transmit video or other image data related to one or more appliances, systems, etc. In some examples, devices providing video monitoring or video feed may be monitoring the premises on a periodic or continuous basis. In some arrangements, the devices providing video monitoring or video feed may be in communication with one or more other sensing devices and may activate or begin monitoring, providing video feed, etc. upon an indication received from the one or more other sensing devices. Various other types of sensing devices and/or characteristics may be monitored via sensing devices 302a-302c.

In some arrangements, one or more of sensing devices 302a-302c may be connected to or in communication with one or more home devices, such as appliances, systems, etc., to monitor one or more characteristics of the home device. For instance, home devices or systems such as a water heater, sump pump, roof, attic (e.g., air flow in attic), washing machine, dryer, refrigerator, freezer, air conditioner, furnace, windows, pipes, occupancy, and the like, may be monitored. Various other appliances and/or systems may be monitored without departing from the invention.

Although the home event detection and processing system 300 includes three sensing devices 302a-302c, the system 300 may include more or fewer sensing devices without departing from the invention. Further, in some examples, each sensing device may be a different type of device and/or may be configured to monitor different characteristics of the home device (e.g., sensing device 302a detects moisture while sensing device 302b detects power consumption). Additionally or alternatively, each sensing device 302a-302c may be connected to or in communication with a different home device, or multiple sensing devices 302a-302b may be connected to or in communication with a single home device such that multiple, different characteristics of the home device are being monitored (e.g., simultaneously). This may permit additional and/or more accurate information to be collected about the home device. Various combinations of the above-described arrangements may also be used without departing from the invention.

Signals and/or data from the sensing devices 302a-302c may be received by the sensing system 300. For instance, signals, video feed, and/or data may be transmitted from the sensing devices 302a-302c to the system 300 via wired or wireless transmission. In some examples, the data and/or signals may be transmitted to a base unit for collection prior to transmission to the system 300 or entity 301 associated with the system 300. In other examples, the data and/or signals may be transmitted directly from each sensor 302 to the system 300 or entity 301.

The signals and/or data from the sensing devices 302a-302c may be received by an event identification module 304. The event identification module 304 may include one or more computing devices containing many or all of the hardware and/or software components of the computing device 101 in FIG. 1. The event identification module 304 may include hardware, software and/or network components configured to receive and/or transmit information to and/or from various computing devices, modules, databases, sensors, and the like.

The event identification module 304 may be configured to perform a set of functions within the home event detection and processing system 300. For instance, the event identification module 304 may collect data and/or signals received from one or more sensing devices 302a-302c and may include one or more algorithms which may be executed by one or more software applications running on generic or specialized hardware within the home event detection and processing system 300 to determine whether data is within a predefined range. The event identification module 304 may receive data, such as previously collected or historical data, from, for example, an operating data database 306. The operating data database 306 may include performance or operational data associated with the systems, devices, etc. being monitored by sensing devices 302a-302c. The data may be data that was previously collected by the system and has been stored. The event identification module 304 may compare newly received data from sensing devices 302a-302c to historical data from operating data database 306 to determine whether the devices being monitored are operating within a predefined or expected range of threshold (e.g., based on the data) or are operating outside of a predefined range, which may indicate occurrence of a home event. Some examples of home events may include fire, leaking or burst pipe, broken window, hot water heater failure, rupture of refrigerator water line, roof damage, sewer backup, loss of electricity, vacancy of the house, natural disasters (e.g., earthquake, flood, hurricane, tornado, etc.), among others.

Upon identifying a home event, the claim processing module 310 may determine whether the home event and any associated damage may be covered by an insurance policy of the user or homeowner. For instance, the claim processing module 310 may initiate a claim to determine whether a policy will cover the damage, whether there is a deductible, an amount of the deductible, and the like. In some examples, this may be performed automatically upon detection of a home event. The claim processing module 310 may obtain additional data from one or more other databases (not shown in FIG. 3) to process the claim. For instance, the claim processing module 310 may receive data associated with the homeowner, insurance policy, and the like. This information may be stored in one or more databases associated with the entity. Further, the claim processing module 310 may receive additional information associated with a severity of the home event or the damage associated therewith. For instance, data received from additional sensing devices may aid in determining the severity of the damage. For example, if the system receives data from the home indicating that a window has been broken (e.g., from a breakage sensor monitoring one or more windows in the home), a moisture sensor in the room with the broken window may provide additional data indicating whether any water damage has occurred due to the broken window (e.g., from rain, snow, etc.). This may aid in indicating a severity of the damage and in determining a cost of the repair of the damage.

In some examples, the claim processing module 310 may identify a deductible associated with the insurance policy. In some arrangements, the claim processing module 310 may compare the cost to repair the damage with the identified deductible. If the deductible is greater than the cost to repair the damage, in some arrangements a notification may be transmitted to the user indicating this information. In arrangements in which a claim may be automatically processed (or default instructions are provided, as will be discussed more fully below) the automatic processing may be cancelled if the deductible is determined to be greater than a cost of the damage and/or the user may be notified of such.

The home event detection and processing system 300 may further include a customer notification module 308. The customer notification module may transmit a notification to the user or customer associated with the home (e.g., homeowner, renter, etc.) indicating that the home event has occurred or identifying the potential issue. The notification may include the nature of the home event. In some examples, the notification may include an indication of the insurance claim being processed, whether the damage is covered by the policy, the amount (if any) of a deductible, and the like.

In some examples, the customer notification module 308 may include one or more customer default settings. For instance, some or all portions of the systems, methods, etc. described herein may be performed automatically. For instance, upon detection of a home event, initiation of an insurance claim may be performed automatically. Further, upon processing the insurance claim, in some examples, the system may automatically arrange or coordinate repair of any damage (e.g., contact a repair provider, establish date for repair, provide access to the home, etc.). Accordingly, the entire process may be performed without user input from the customer, in some arrangements. A user may identify what, if any, portions of the process should be performed by setting one or more customer defaults.

Figure 4:
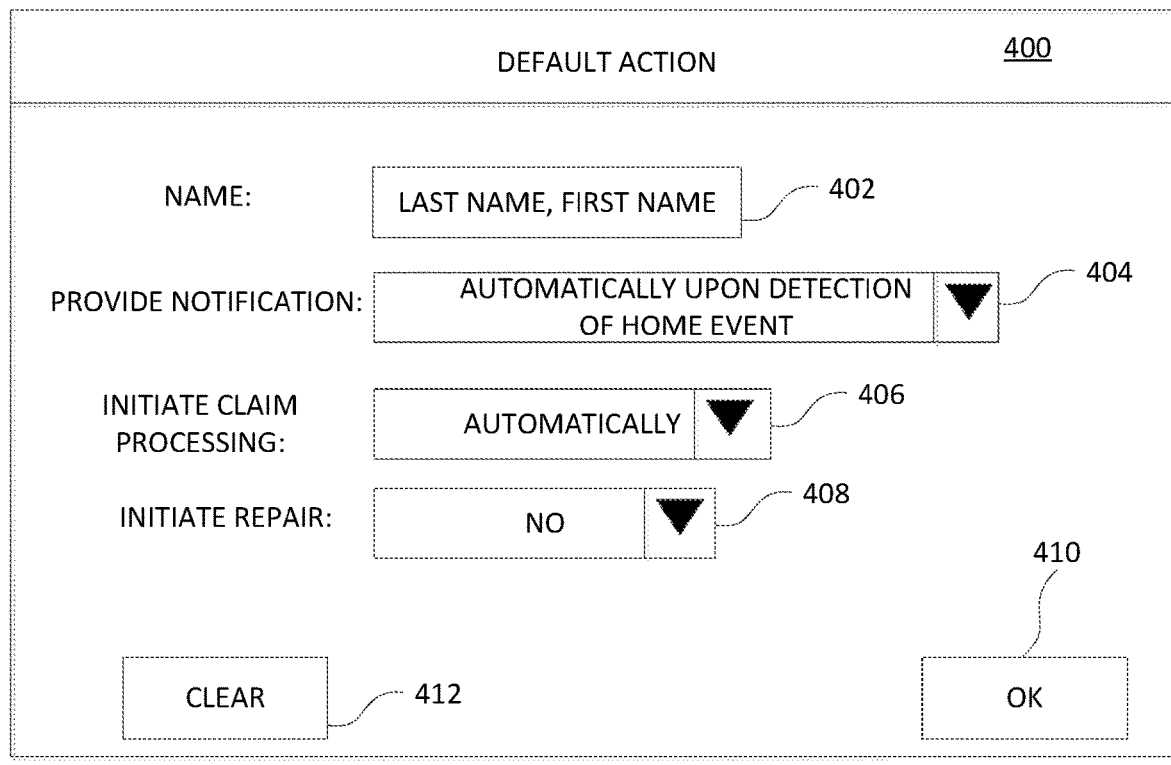
FIG. 4 is an example user interface for setting default instructions according to one or more aspects described herein.

FIG. 4 illustrates one example user interface that may be used to set customer defaults. The user interface 400 includes field 402 in which the name of the policy holder may be identified. Field 404 indicates when the user or customer would prefer to receive a notification. In the example shown in FIG. 4, the user has selected to receive a notification upon detection of a home event. However, various other options may be available for selection, such as, upon processing of insurance claim related to home event, upon completion of repair associated with home event, never, and the like. Various other options may be available for selection as a default without departing from the invention. The selection may be made, as shown in FIG. 4, from a drop down menu (e.g., by selecting down arrow associated with field 404) or may be made using various other known methods of selection (clicking, selecting radio button, etc.).

Field 406 indicates when the user or customer would like to initiate claim processing. In FIG. 4, the user has indicated that claim processing should be initiated automatically (e.g., automatically upon detection of a home event). In other examples, a user may select, upon receiving user input, upon determining that a cost of the damage is above a predetermined threshold, never, and the like. Various other options may be available for selection without departing from the invention.

Field 408 indicates whether (or when) the user has selected to initiate repair (e.g., have the system initiate/coordinate repair. In field 408, the user has selected not to have repair initiated by the system. In other examples, the user may select options such as, automatically upon detection of a home event, automatically upon processing of insurance claim, upon receiving user input electing repair, and the like. Various other options may be available for selection without departing from the invention.

The user or customer may select "OK" option 410 to save the default settings selected or "CLEAR" option 412 to clear the selections made.

The default options illustrated in the user interface 400 of FIG. 4 are merely some examples of default options available to a user. Various other options may be provided to the user without departing from the invention.

In some examples, the default settings may include one or more options for a user to opt out of the system or default actions. For instance, in some arrangements, the default action may be to prompt a user for user input before proceeding with one or more of initiating a claim, processing a claim, arranging repair, etc. Accordingly, notifications may be transmitted to the user indicating that the system will proceed with the default action upon receiving user input or unless user input is receiving overriding the default instructions.

With further reference to FIG. 3, the system may determine whether any default settings exist in customer notification module 308 and may provide notifications to the customer according to the default settings. The notifications may be provided to a computing device associated with the user. Various example computing devices 314 are shown in FIG. 3. For instance, a notification may be transmitted to a user's smartphone 314a, personal digital assistant (PDA) 314b, tablet computer 314c, cell phone 314d or other computing device 314e. The notification may be sent via email, short message service (SMS), or via an online application or mobile application on a mobile device. In some examples, the notification may be transmitted to a user interface of a vehicle associated with the user or customer. In still other examples, a notification may be sent to multiple computing devices of the user and/or via multiple transmission methods.

The home event detection and processing system 300 may further include a repair coordination module 316. The repair coordination module may be in communication with or connected to one or more other modules within the system and may coordinate or arrange repair of any damage associated with the home event. For instance, the repair coordination module may identify a service entity to complete the repair, may schedule a date for the repair, may coordinate access to the home if needed, etc. The repair coordination module may also communicate with one or more computing devices associated with one or more service entities in order to coordinate the repair. For instance, the extent of damage, scheduling, etc. may be performed via communication between the repair coordination module 316 and one or more computing devices associated with a selected service entity.

Figure 5:
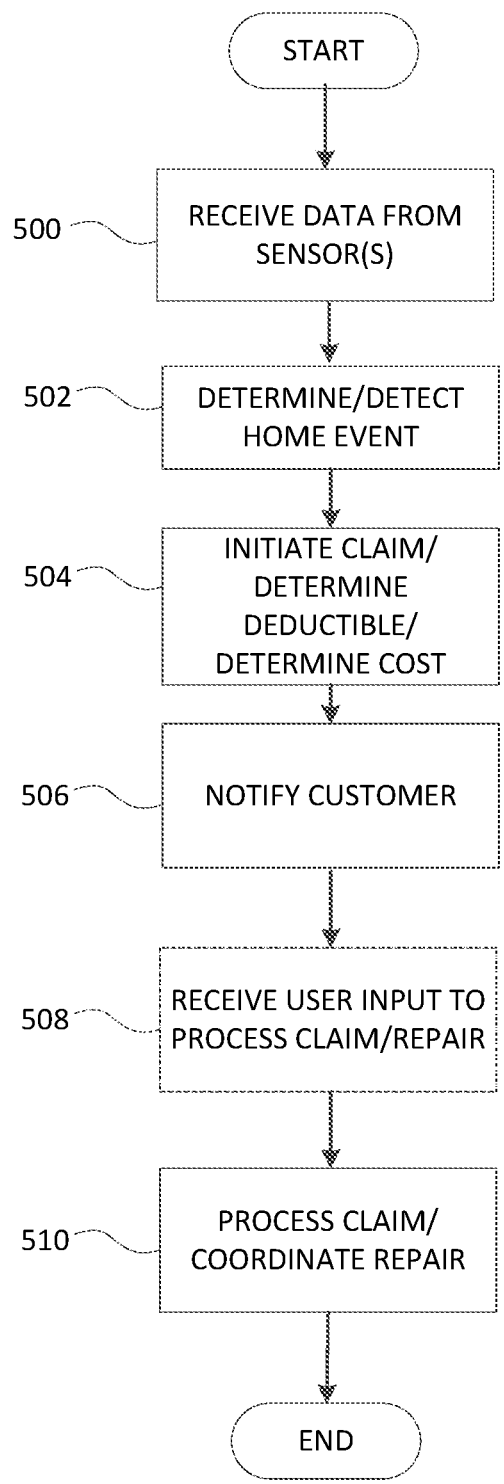
FIG. 5 is an example method of detecting a home event and processing data associated with the home event according to one or more aspects described herein.

FIG. 5 illustrates one example method of detecting a home event and processing the data received associated with the home event. In step 500, data from one or more sensing devices may be received. The data may be received from one or more sensors associated with one home device or system, and/or from one or more sensors associated with a plurality of home devices or system. In step 502, the data received may be processed to determine whether a home event has occurred. Determination of whether a home event has occurred may be based on a comparison of the received data to previously received or stored data (e.g., historical data) for the same or similar home devices or systems.

In step 504, an insurance claim may be initiated and/or a deductible amount may be determined. In some arrangement, step 504 may be an optional step performed based on received user input or previously received user input establishing a default setting to initiate an insurance claim and/or determine a deductible. Initiation of the claim may include requesting additional information associated with the insurance policy. The additional information may be used with the received data to determine a nature of the event, an extent of damage caused by the home event, whether the damage is covered under the policy, an amount of a deductible, and the like. In some examples, use of the home event detection and processing system (e.g., monitoring the home for events, automatically processing claims or automatically processing repairs) may result in a reduced deductible for the user because the event may be detected more quickly by the monitoring system than by the user, thereby reducing the damaging. In some examples, the deductible may be waived in exchange for implementation of the system described herein.

Further, step 504 may further include determining a cost associated with repair of the damage. In some examples, the determine deductible may be compared to the cost to determine whether the cost to repair is less than the identified deductible.

In step 506, the customer may be notified of the home event and/or of the determined deductible, claim initiation, etc. As discussed above, the notification may be transmitted to a computing device of the user and may be transmitted based on default settings associated with the user. For instance, the user may request to be notified of any detected home event when detected. Alternatively, the user may request notification when the insurance claim has been initiated and information is available regarding deductible, coverage, etc.

In some examples, step 506 may be performed prior to step 504 (e.g., upon detecting a home event and prior to initiating a claim).

In optional step 508, user input may be received to continue processing of a claim and/or initiate repair. For example, upon receiving a notification of the home event, the user may authorize initiation of a claim (if not automatically performed), further processing of the claim, coordination of repair of any damage, and the like.

Alternatively, in some examples, a user may have established default settings for the process and, thus, the process may not receive user input to process an insurance claim, coordinate repair of damage, etc. Instead, the process may continue at step 510 in which the insurance claim is automatically processed and/or the repair is coordinated. For instance, the insurance claim may be processed, such as by the insurance provider implementing the system. In some examples, based on particular default settings of the user, the system may automatically coordinate with a service entity to repair any damage associated with the home event. Accordingly, in some arrangements, the home event may be detected, an insurance claim may be processed and repair may be coordinated automatically (e.g., without any user input from the homeowner, renter, customer, policy holder, etc.).

Figure 6:
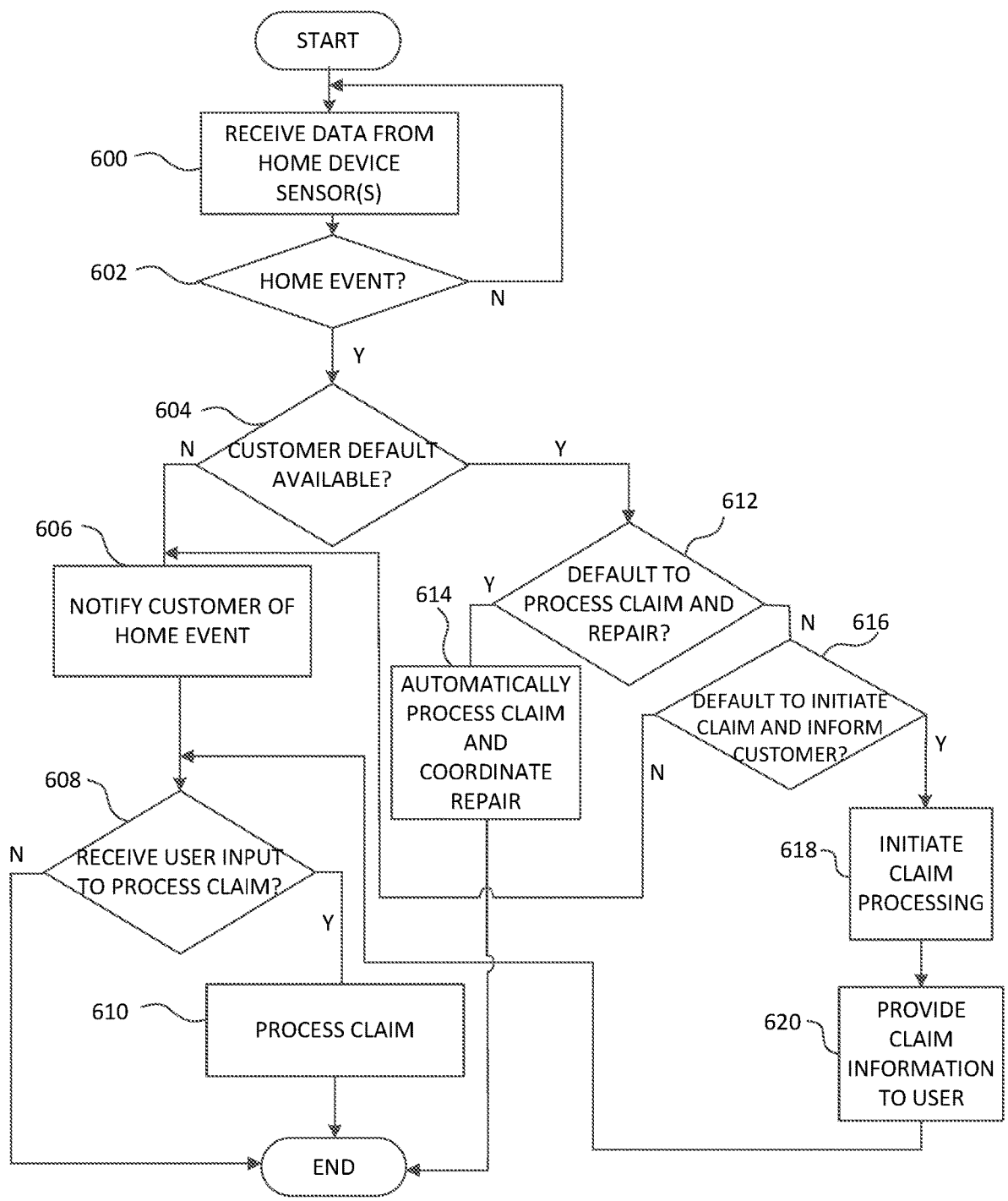
FIG. 6 is an example method of detecting a home event and processing data associated with a home even according to one or more aspects described herein.

FIG. 6 illustrates another method of detecting a home event and processing the data received. In step 600, data may be received from one or more sensing devices associated with one or more home devices or systems. In step 602, the received data may be processed (e.g., compared with previously received/stored data) to determine whether a home event has occurred. If, in step 602, no home event is detected (e.g., the comparison does not result in an indication that performance of any of the home devices or systems are operating outside of a normal range), the process will return to step 600 to continue receiving data.

If, in step 602, a home event is detected, a determination is made in step 604 as to whether one or more customer defaults have been set for the customer associated with the home being monitored. If, in step 604, no customer defaults are available, a notification may be transmitted to the customer in step 606. The notification may include an indication of the occurrence of the home event, type of home event, etc. In some examples, the notification may include an offer to proceed with processing an insurance claim associated with the home event. In step 608, a determination may be made as to whether user input has been received to process an insurance claim associated with the home event. If not, the process may end. The user or customer may then later request to process the claim, arrange for repair, etc.

If, in step 608, user input is receive to proceed with processing an insurance claim, the claim will be processed in step 610 and the process may end. Additionally, as discussed above, the user may, in some examples, be prompted with an option to coordinate repair via the system. In some arrangements, processing the claim may include making a payment to the customer, user, policy holder, etc. For instance, the system may identify, as discussed above, a cost of repair of the damage and processing of the claim may include, in some examples, a payment made to the user to cover that cost. The payment may be made to the user automatically upon processing the claim (e.g., no additional user input may be received in order to receive payment).

In some examples, processing of the claim may further include identifying accommodations for the policy holder/home owner if they are needed. For instance, if the damage is extensive, in some examples, the homeowner may have to leave the premises due to the damage (e.g., in case of a fire, natural disaster, etc.). Accordingly, in some arrangements, processing of the claim may include identification of alternative accommodations for the homeowner (e.g., a hotel) and may include reserving those alternative accommodations.

If, in step 604, customer default settings are available, a determination may be made in step as to whether the default settings include processing an insurance claim and coordinating repair of the damage in step 612. If the default instructions indicate that the claim should be processed and repair arranged, the system may automatically proceed with processing an insurance claim and coordinating repair of the damage in step 614. In some examples, the repair may include pre-established arrangements, such as placing a key with a neighbor or in a lockbox having a code, such that the system may instruct any repair personnel as to how to obtain entry to the house.

If, in step 612, the default instructions do not indicate that an insurance claim should be processed and repair should be coordinated, a determination may be made in step 616 as to whether the default instructions include initiating a claim and notifying the customer. If the instructions do not include those default options, the process may move to step 606 and a notification may be transmitted to the customer.

If, in step 616, the default instructions include initiating a claim and notifying the customer, the claim may be initiated in step 618. Initiating a claim may include various aspects discussed above, including obtaining additional information associated with an insurance policy of the customer. In step 620, a notification is transmitted to the user including claim information (e.g., amount of deductible, applicable coverage, etc.). The notification may include information associated with the home event. The process may then continue at step 608 with a determination of whether user input has been received to process the claim.

The various home event detection and processing systems, methods, etc. described herein may provide for early detection of any potential issues in a home due to monitoring of one or more devices, system, etc. Accordingly, upon occurrence of a home event, damage may be minimized because a response to the event may occur earlier than it would have without.

Further, the arrangements described herein may allow for continued development of a relationship between the insurance provider or entity and the customer. For instance, upon detection of a home event, the agent associated with the customer or homeowner may be notified and the agent may contact the homeowner to offer assistance, as needed.

Additionally or alternatively, the system may provide for increased interaction, as desired, between the customer and the insurance provider or entity. For instance, the user may be, in some examples, prompted with notifications along each step of the processes described herein (e.g., upon detection of an event, initiation of a claim, repair, etc.) as desired. Accordingly, the user may remain aware of the steps of the process, progress, and the like. This may also permit a user to provide feedback or opt out of any step along the process. Alternatively, users who do not desire to have as much information may choose to receive fewer or no notifications and may permit the system to handle some or all of the detection, claim processing, repair, etc. with little or no additional input from the user (e.g., homeowner, policy holder, etc.).

In still other examples, the system may quickly respond and provide assistance during catastrophic situations. For instance, in the event of a natural disaster, such as a hurricane, tornado, etc., in some examples, the extent of the damage might not be immediately known. Accordingly, full processing of the claim for repair or replacement might not be available immediately. However, assistance may still be available to the policy holder via the system. For instance, if the policy includes payment for alternative accommodations in such circumstances, that portion of the claim may be processed and payment to the policy holder may be made to cover the cost of the accommodations. In some examples, a reservation or other arrangement of the accommodations may be performed by the system. The system may communicate this information to the user via a computing device, such as a mobile device.

While the aspects described herein have been discussed with respect to specific examples including various modes of carrying out aspects of the disclosure, those skilled in the art will appreciate that there are numerous variations and permutations of the above described systems and techniques that fall within the spirit and scope of the invention. For example, one of ordinary skill in the art will appreciate that the steps illustrated in the illustrative figures may be performed in other than the recited order, and that one or more steps illustrated may be optional in accordance with aspects of the disclosure. Further, one of ordinary skill in the art will appreciate that various aspects described with respect to a particular figure may be combined with one or more other aspects, in various combinations, without departing from the invention.

The invention claimed is:

1. A home event detection and processing system comprising:
    at least one sensing device in communication with and monitoring one or more aspects of a home device of a user;
    at least one video monitoring device to capture and transmit image data related to the home device of the user, the at least one video monitoring device being in communication with the at least one sensing device;
    a processing unit comprising a processor; and
    a non-transient memory unit storing computer-executable instructions configured to:
        determine an occurrence of a home event based on first information including one or more signals from the at least one sensing device,
        determine, based at least in part on the one or more signals from the at least one sensing device and video data received from the at least one video monitoring device, a cost of repair of damage corresponding to the home event,
        retrieve second information different from the first information, the second information being associated with an insurance policy covering the home device;
        based on the second information, determine an insurable event deductible and determine that default user instructions identified and selected by the user to designate processes to be performed include an identified and selected instruction to automatically initiate an insurance claim;
        initiate the insurance claim to cover the cost of repair of damage caused by the home event, in response to the default user instructions including an instruction to automatically initiate the insurance claim; and
        in response to determining that the insurable event deductible is greater than the cost of repair of damage, cancel, by the home event detection and processing system, automatic processing of the insurance claim and transmit a notification to a computing device of the user indicating the insurable event deductible is greater than the cost of repair of damage.

2. The system of claim 1, wherein initiating the insurance claim further includes processing a first portion of the insurance claim when processing of a full claim is not available.

3. The system of claim 1, further configured to:
determine that the default user instructions include an identified and selected instruction to initiate repair of damage associated with the home event; and
responsive to determining that the default user instructions include the identified and selected instruction to initiate repair of the damage, arrange for repair of the damage including identifying pre-established arrangements to facilitate repair of the damage.

4. The system of claim 3, further configured to:
receive, from at least one additional sensing device monitoring one or more aspects of a second home device, third information different from the first information and the second information, the third information indicating a severity of the damage caused by the home event.

5. The system of claim 3, wherein arranging for the repair is performed without any additional user input from a user associated with the home device.

6. The system of claim 3, wherein arranging for repair includes scheduling repair with a service entity.

7. The system of claim 1, wherein automatically initiating the insurance claim is performed without additional user input from a user associated with the insurance policy.

8. A method, comprising:
determining an occurrence of a home event based on first information including one or more signals from at least one sensing device,
determining, based at least in part on one or more signals from the at least one sensing device and video data received from at least one video monitoring device, a cost of repair of damage corresponding to the home event,
retrieve second information different from the first information, the second information being associated with an insurance policy covering a home device;
based on the second information, determining, by a home event detection and processing system, an insurable event deductible and determining that default user instructions identified and selected by the user to designate processes to be performed include an identified and selected instruction to automatically initiate an insurance claim;
initiating, by the home event detection and processing system, the insurance claim to cover the cost of repair of damage caused by the home event, in response to the default user instructions including an instruction to automatically initiate the insurance claim; and
in response to determining that the insurable event deductible is greater than the cost of repair of damage, cancelling, by the home event detection and processing system, automatic processing of the insurance claim, and transmitting a notification to a computing device of the user indicating that the insurable event deductible is greater than the cost of repair of damage.

9. The method of claim 8, wherein initiating the insurance claim includes processing a first portion of the insurance claim when processing of a full claim is unavailable.

10. The method of claim 8, further comprising:
determining, by the home event detection and processing system, that the default user instructions include an identified and selected instruction to initiate repair of damage associated with the home event; and
responsive to determining that the default user instructions include the identified and selected instruction to initiate repair of the damage, arranging, by the home event detection and processing system, for repair of the damage including identifying pre-established arrangements to facilitate repair of the damage.

11. The method of claim 10, further comprising:
receiving, from at least one additional sensing device monitoring one or more aspects of a second home device, third information different from the first information and the second information, the third information indicating a severity of the damage caused by the home event.

12. The method of claim 10, wherein arranging for the repair is performed without any additional user input from a user associated with the home device.

13. The method of claim 10, wherein arranging for repair includes scheduling repair with a service entity.

14. The method of claim 8, wherein automatically initiating the insurance claim is performed without additional user input from a user associated with the insurance policy.

* * * * *